Oct. 7, 1947.  C. R. BROWN  2,428,548
GENERATOR ATTACHMENT
Filed Aug. 31, 1945

WITNESSES:

INVENTOR
Charles R. Brown.
BY
Paul E. Friedemann
ATTORNEY

Patented Oct. 7, 1947

2,428,548

UNITED STATES PATENT OFFICE 2,428,548

GENERATOR ATTACHMENT

Charles R. Brown, Norwood, Pa., assignor to Westinghouse Electric Corporation, East Pittsburgh, Pa., a corporation of Pennsylvania Application August 31, 1945, Serial No. 613,763

3 Claims. (Cl. 192—53)

My invention relates to portable electric generators or the like apparatus which are to be driven from a rotating shaft or machine element for measuring, indicating, testing, balancing and the like purposes, and aims at providing such apparatus with coupling means that are capable of frictionally starting the apparatus and maintaining it in a fixed phase position to the driving rotor once the apparatus has accelerated up to or near the speed of the rotor.

For instance, in known equipment for balancing rotating machine elements, a tachometric type generator is mechanically connected with the rotor in order to generate a sine wave voltage which serves as a time reference for unbalance vibrations determined by vibration pickups. Such equipment permits determining appropriate places of the rotor at which the addition or removal of material will eliminate a static or dynamic unbalance of the rotor. As a rule, the sine wave generator is rigidly bolted to the frame of the machine to be balanced and the generator shaft, upon proper alignment with the shaft of the rotor, is then rigidly secured to the rotor shaft. These manipulations and adjustments are time consuming. It, therefore, is one of the specific objects of my invention to devise a sine wave generator, or an attachment for such a generator, which can be operated in the manner of the known hand tachometers but which nevertheless secures a fixed phase relation between generator and rotor once the generator is brought up to speed.

According to the invention, I provide the sine wave generator or the like portable apparatus with a coupling device which has a housing or main structure firmly attached to the shaft of the generator or apparatus to be driven. A spindle is mounted in the structure so that it extends in the axial direction of the shaft. The spindle is displaceable relative to the structure in the axial direction and is biased by spring means for motion away from the shaft to be driven. A friction prod is mounted at the end of the spindle remote from the shaft and serves to engage the rotor from which the generator or main structure of the coupling device is to be driven. A portion or member, which projects from the structure at the side of the friction prod, serves to establish a positive driving engagement but enters into operation only after the generator and coupling assembly has been forced against the driving rotor in opposition to the spring and by a sufficient extent to secure a frictional starting of the assembly.

These features of my invention and the operation of the device will be more fully understood from the following description of the embodiment exemplified by the drawing, in which.

Figure 1:
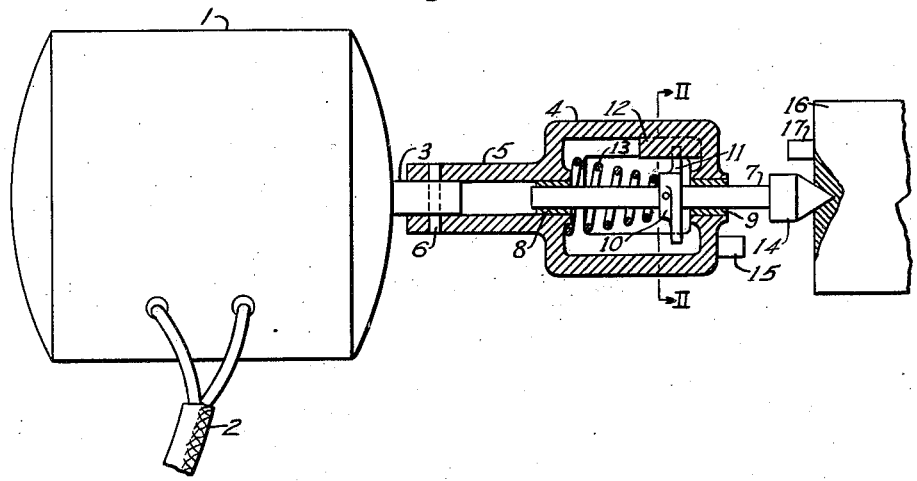
Figure 1 is a part sectional view of the complete generator and coupling unit and shows also part of the rotor from which the generator rotation is to be derived.
Figure 2:
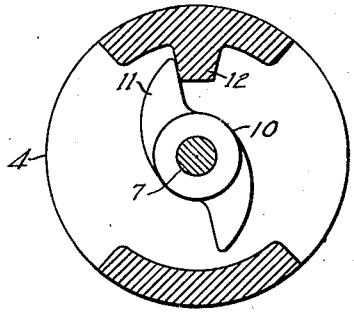
Fig. 2 is a radial cross section through the coupling device proper along a plane denoted in Fig. 1 by the dot and dash line marked II—II.
Figure 3:
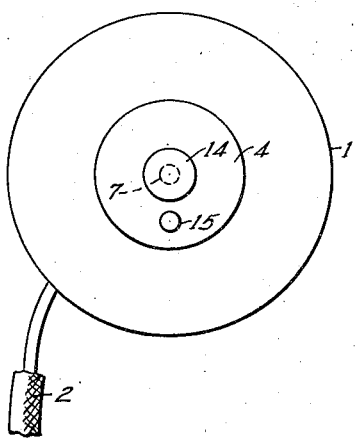
Fig. 3 is an axial view of the generator and coupling unit.

According to the drawing, a sine wave generator 1 of the portable type whose output cable is denoted by 2 has its shaft 3 attached to a coupling device. This device has a structure 4 which forms a housing and extends into a sleeve portion 5. The sleeve portion engages the generator shaft 3 and is fastened thereto by means of a cross pin 6. A spindle 7 is journalled in sleeve bearings 8 and 9 of the structure 4. The spindle 7 extends coaxially with the generator shaft 3 and is axially slidable in the bearings 8 and 9. The hub portion 10 of a driver 11 is rigidly attached to the spindle 7. The driver 11 is engageable with a stop 12 which forms part of the structure 4 or is rigidly attached thereto. A compression spring 13 is arranged in the structure 4 and abuts against the structure and against the driver 11 so as to bias the spindle 7 for axial motion away from the generator shaft 3. A friction prod 14 of conical shape consisting, for instance, of rubber is mounted on the exterior end of spindle 7.

The rotor to be balanced is shown at 16. Its center is determined by a lathe center hole. The rotor has some projection, like the illustrated pin 17, located eccentrically with respect to the center hole.

The stop 12 is of limited axial extent. Consequently the driver 11 is in coupling engagement with stop 12 only as long as the spindle 7 is not forced into the housing structure 4 beyond the extent of the axial stop and driver engagement.

When performing a balancing method, serving to test the rotor 16 for unbalance and for eliminating such unbalance, the sine wave generator 1 is manually held against the rotor 16, so that the prod 14 engages the lathe center hole as shown in Fig. 1. The revolution of rotor 16 is then frictionally imparted to the prod 14, so that the driver 11 abuts against the stop 12 and entrains the structure 4 and hence the shaft 3 of the generator 1. The generator is started by virtue of the friction between prod 14 and rotor 16, and the occurring frictional slip permits the generator to gradually accelerate. The operator, by pushing the generator farther against the rotor, causes the spindle 7 to recede into the structure 4. As a result, the opposing force of the biasing spring 13 and hence the friction between prod 14 and rotor 16 is gradually increased. In this manner, the generator is brought up or nearly up to the speed of the driving rotor. During the accelerating period the pins 15 and 17 rotate relative to each other, but they are at first not in engagement with each other and hence do not interfere with the above-described performance. A further compression of the spring 13 causes the driver 11 to slip off the stop 12, while now the pins 15 and 17 enter into engagement with each other. From this moment on, the rotor 16, by its pin 17, is directly coupled with the structure 4 and the shaft 3 so that the coupling is no longer frictional but involves a positive transmission of motion, thereby securing a fixed phase position of the generator relative to the rotor 16 as is necessary for a proper correlation of the generated sine wave voltage to the impulses supplied by the vibration pickups (not illustrated).

For operating speeds up to about 4000 rotations per minute, the coupling device does not necessarily have to be balanced in order to afford a satisfactory performance; at higher speeds it is preferable to give the device a dynamically balanced design in order to avoid the occurrence of disturbing vibrations.

It will be understood from the foregoing that it is one of the essential features of my invention to provide a coupling device for portable generators and the like operators which secures a gradual acceleration by frictional means but operates by positive action and with a given phase relation between driving rotor and driver apparatus after the operators have been frictionally accelerated to full or nearly full speed. It will further be obvious to those skilled in the art that the design of units or coupling devices according to the invention permits of various modifications within the scope of the invention as set forth in the claims attached hereto.

I claim as my invention:

1. A coupling device for driving the shaft of a portable apparatus from a rotor, comprising a structure having a portion designed for attachment to the shaft in order to impart revolution thereto, a spindle journalled in said structure coaxially to said portion and being axially displaceable relative to said structure, a prod axially mounted on said spindle at the spindle end remote from said portion so as to be frictionally engageable with the rotor, spring means for axially biasing said spindle relative to said structure in the direction toward said prod, a part mounted on said spindle, said structure having a stop engageable by said part whereby said structure is revolved when said prod is frictionally driven by the rotor, said stop having a limited axial length to become disengaged from said part when said structure is axially displaced a given extent relative to said spindle in opposition to said spring means, and means projecting from said structure at the side of said prod for positively engaging the rotor in a single predetermined relative angular position after, due to relative axial motion between said structure and said spindle, said stop is disengaged from said part.

2. A coupling device for driving the shaft of a portable apparatus from a rotor comprising a structure having a portion designed for attachment to the shaft in order to impart revolution thereto, an elongated member arranged in said structure so as to extend coaxially with said portion and being axially displaceable relative to said structure, a friction prod endwise secured to said member at the side remote from said portion so as to be engageable with the rotor, spring means for biasing said member for axial motion relative to said structure in the direction of said prod, said structure and said member being engageable with each other over a limited range of relative axial displacement so as to permit relative rotation only when they are axially displaced a given extent relative to each other in opposition to said spring means, and means on said structure at the side of said prod for positively engaging the rotor in a single predetermined angular position when said structure and said member are axially displaced relative to each other more than said given extent.

3. A portable apparatus for balancing and the like measuring and testing purposes, comprising a generator having a shaft to be driven from a rotor, a revolvable structure having a sleeve secured to said shaft for driving said shaft, a spindle journalled in said structure coaxially with said shaft and being axially displaceable relative thereto, spring means mounted in said structure for biasing said spindle away from said shaft, a friction prod mounted on the end of said spindle remote from said shaft, said structure and said spindle having mutually engageable stop means of limited axial extent so that said spindle is capable of revolving said structure unless it is axially displaced a given minimum extent relative to said structure in opposition to said spring means, and a stop disposed on said structure at the side of said prod for positively engaging the rotor in a single predetermined angular position when said spindle is axially displaced said given extent.

CHARLES R. BROWN.

REFERENCES CITED

The following references are of record in the file of this patent:

UNITED STATES PATENTS

| Number | Name | Date |
|---|---|---|
| 1,854,829 | Doring et al. | Apr. 19, 1932 |
| 1,899,669 | Carson | Feb. 28, 1933 |
| 2,167,373 | Rocke | July 25, 1939 |

FOREIGN PATENTS

| Number | Country | Date |
|---|---|---|
| 431,024 | France | Aug. 30, 1911 |